(12) United States Patent  
Narayanan et al.

(10) Patent No.: US 8,949,315 B2
(45) Date of Patent: Feb. 3, 2015

(54) SYSTEM AND METHOD FOR GENERATING WEB ANALYTIC REPORTS

(75) Inventors: Babu Ozhur Narayanan, Bangalore (IN); Vineel Chandrakanth Gujjar, Bangalore (IN); Jayanth Kalle Marasanapalle, Bangalore (IN); Daniel Hogan, Oakland, CA (US)

(73) Assignee: NBCUniversal Media, LLC, Wilmington, DE (US)

( * ) Notice: Subject to any disclaimer, the term of this patent is extended or adjusted under 35 U.S.C. 154(b) by 832 days.

(21) Appl. No.: 12/826,780

(22) Filed: Jun. 30, 2010

(65) Prior Publication Data

US 2012/0005257 A1    Jan. 5, 2012

(51) Int. Cl.
*G06F 15/16* (2006.01)
*G06F 17/30* (2006.01)

(52) U.S. Cl.
CPC .................................. *G06F 17/3089* (2013.01)
USPC .............................. 709/203; 709/225; 714/39

(58) Field of Classification Search
USPC ................................................. 709/224, 203
See application file for complete search history.

(56) References Cited

U.S. PATENT DOCUMENTS

| 6,912,534 | B2 | 6/2005 | DeBettencourt et al. | |
| 7,600,014 | B2* | 10/2009 | Russell et al. | 709/224 |
| 2002/0099818 | A1* | 7/2002 | Russell et al. | 709/224 |
| 2008/0046562 | A1* | 2/2008 | Butler | 709/224 |
| 2008/0059262 | A1 | 3/2008 | Dao et al. | |
| 2008/0189408 | A1 | 8/2008 | Cancel et al. | |
| 2008/0195664 | A1* | 8/2008 | Maharajh et al. | 707/104.1 |
| 2008/0255944 | A1* | 10/2008 | Shah et al. | 705/14 |
| 2008/0275980 | A1* | 11/2008 | Hansen | 709/224 |
| 2009/0013173 | A1* | 1/2009 | Savage | 713/150 |
| 2009/0018996 | A1 | 1/2009 | Hunt et al. | |
| 2010/0251128 | A1* | 9/2010 | Cordasco | 715/736 |
| 2011/0246267 | A1* | 10/2011 | Williams et al. | 705/14.4 |
| 2013/0263023 | A1* | 10/2013 | Goodwin et al. | 715/760 |

OTHER PUBLICATIONS

Andrew B. King; Types of Web Analytics Software: Chapter 10.2—Website Optimization; URL : http://www.oreillynet.com/pub/a/css-html/excerpts/9780596515089/website-optimization-metrics.html; 8 Pages.

* cited by examiner

*Primary Examiner* — Jude Jean Gilles
*Assistant Examiner* — Jaren M Means
(74) *Attorney, Agent, or Firm* — Fletcher Yoder, PC (57) ABSTRACT

A system for generating web analytic reports includes a client interface unit configured to receive one or more predefined tagging conditions from a client for generating a set of tagging rules based on the one or more predefined tagging conditions. The system also includes a tag generation unit configured to generate a client tagged data based on the set of tagging rules. The system also includes an output interface unit configured to generate web analytic reports via analyzing the client tagged data based on the set of tagging rules.

28 Claims, 6 Drawing Sheets

SYSTEM AND METHOD FOR GENERATING WEB ANALYTIC REPORTS

BACKGROUND

The invention relates generally to web analytics and more particularly, to a system and method for generating web analytic reports.

Generally, different organizations measure online traffic of web users visiting the organization's website to determine, for example, popularity, target advertising, optimization level of website content and performance and commercial value associated with the websites, sections and specific web pages. The organizations employ various vendors to measure, analyze and generate reports of the online traffic of web users visiting the website. Conventionally, the vendors employ two approaches to collect data for measuring the online traffic including logfile analysis and webpage tagging.

Typically, the webpage tagging includes inserting a tag in the metadata of the webpage that is programmed to collect all user information and transfer the information to the vendors for analysis. The organizations need web analytic reports of specific user information for different situations and circumstances. Therefore, most of the user information at different situations is not useful but the organizations are required to pay the vendors for the analysis of the complete user information to get the desired web analytic reports for specific user information. The analysis of the complete user information results in undesired higher costs to the organizations.

An approach employed to reduce the higher costs of analyzing complete user information is to update the tags in the web pages constantly to transfer only the desired information to the vendors. Contrastingly, updating tags in the web pages constantly is tedious and includes higher costs.

There is a need for a simple, improved system and method to address the aforementioned issues.

BRIEF DESCRIPTION

In accordance with an embodiment of the invention, a system for generating web analytic reports is provided. The system includes a client interface unit configured to receive one or more predefined tagging conditions from a client for generating a set of tagging rules based on the one or more predefined tagging conditions. The system also includes a tag generation unit communicatively coupled to the client interface unit, the tag generation unit configured to output a client tagged data. The tag generation unit further comprises a user interface unit configured to receive a user data from a plurality of users and at least one of a webpage data from a webpage hosting server for generating a user tagged data including an code based on the user data and the at least one of the webpage data. The tag generation unit further includes a processing unit communicatively coupled to the user interface unit for receiving the user tagged data, wherein the processing circuitry is configured to generate a client tagged data based on the user tagged data and the set of tagging rules. The system also includes an output interface unit communicatively coupled to the tag generation unit for receiving the client tagged data, the output interface unit generates web analytic reports via analyzing the client tagged data based on the set of tagging rules.

In accordance with another embodiment of the invention a method for generating web analytic reports is provided. The method includes generating a set of tagging rules based on one or more predefined tagging conditions received from a client. The method also includes generating a user tagged data including a code, wherein the code is determined via analyzing a user data received from a plurality of users and at least one of a webpage data received from a webpage hosting server based on the set of tagging rules. The method further includes generating a client tagged data based on the user tagged data and the set of tagging rules. The method also includes generating web analytic reports via analyzing the user tagged data and the client tagged data based on the set of tagging rules.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present invention include a system and method of generating web analytic reports. The system for generating web analytic reports include a client interface unit configured to receive one or more predefined tagging conditions from a client and generates a set of tagging rules based on the one or more predefined tagging conditions. The set of tagging rules is transmitted to a tag generation unit. The tag generation unit includes a user interface unit, wherein the user interface unit collects a user data from a plurality of users and a web page data from a webpage hosting server based on the set of tagging rules and generates a user tagged data. A user interface unit transmits the user tagged data to a processing unit within the tag generation unit for filtration and generates a client tagged data based on the user tagged data and the set of tagging rules. The client tagged data is transferred to an output interface unit that generates web analytic reports via analyzing the client tagged data based on the set of tagging rules.

Commonly, different organizations employ vendors to analyze and create web analytic reports based on user information collected by the organizations using different methods. Generally, the user information is collected via a webpage tagging. Webpage tagging includes inserting a tag in the metadata of a webpage to collect information of users visiting the webpage. The tag is a code that collects several kinds of user information and transfers the whole user information to the vendors for analytical purposes. The vendors analyze the whole user information and provide web analytic reports to the organizations. However, the organizations need analysis and reports of only specific user information for different situations and circumstances to meet their targeted requirements. Conventionally, the organizations need to pay the vendors for the analysis of the whole user information resulting in huge costs for the organizations.

Furthermore, altering the tags in each webpage to meet the targeted requirements of the organization at different occasions to collect and transfer specific user information is tedious and costly. Therefore, a system and method for reducing the organizations cost to obtain the web analytic report from the vendor is described below in detail.

Figure 1:
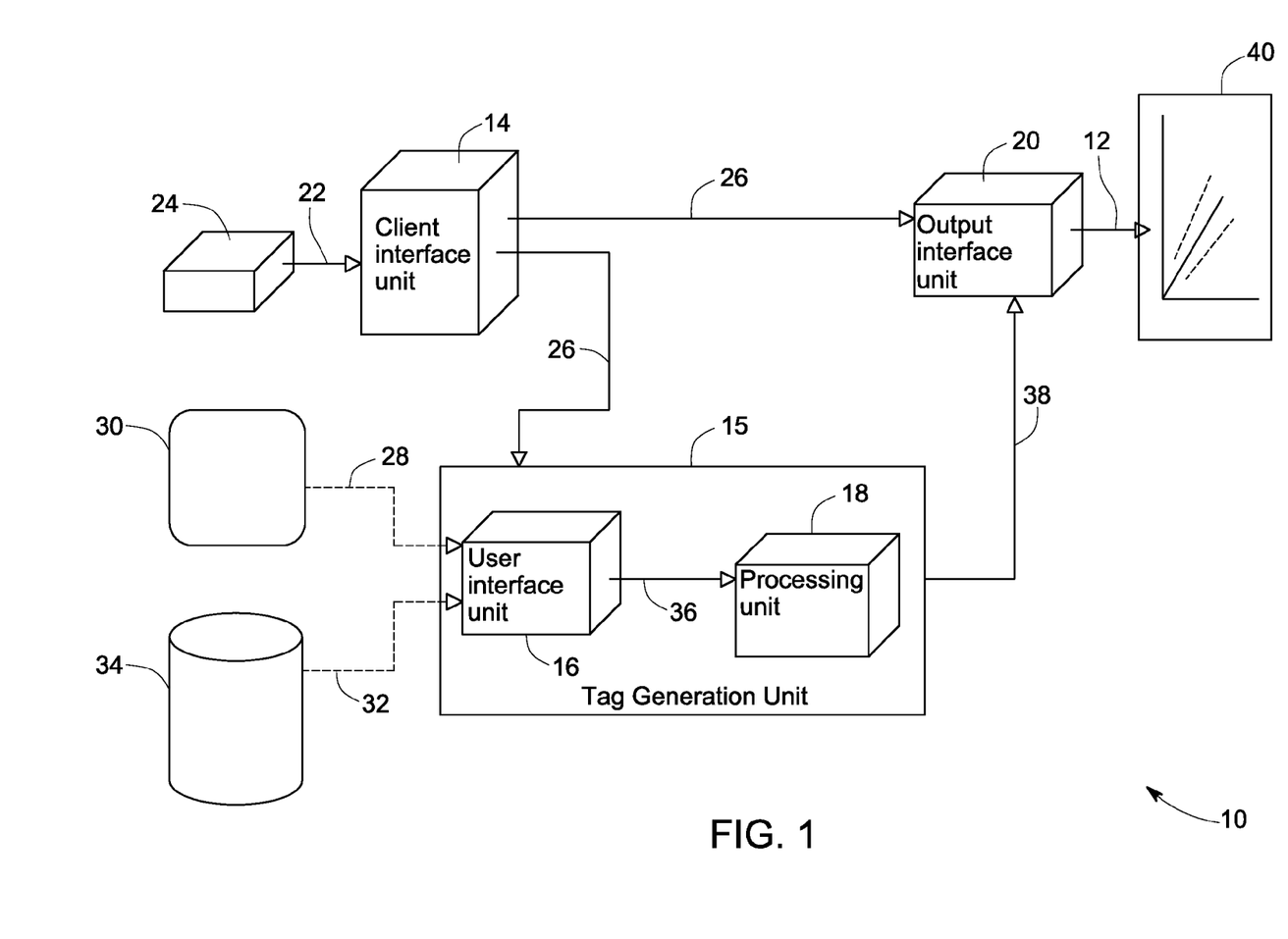
FIG. 1 is a block diagram of a system for generating web analytic reports in accordance with an embodiment of the invention.

FIG. 1 is a block diagram of a system 10 for generating web analytic reports 12 in accordance with an embodiment of the invention. The system 10 includes a client interface unit 14, a tag generation unit 15 and an output interface unit 20. The tag generation unit 15 further includes a user interface unit 16 and a processing unit 18. The client interface unit 14 is configured to receive one or more predefined tagging conditions 22 from a client 24 for generating a set of tagging rules 26 based on the one or more predefined tagging conditions 22 explained in detail below in the subsequent paragraphs. The set of tagging rules 26 is transferred to the tag generation unit 15 and the output interface unit 20 that are communicatively coupled to the client interface unit 14.

Furthermore, the tag generation unit 15 generates the client tagged data 38 based on the set of tagging rules 26 received from the client interface unit 14. In an embodiment, the tag generation unit 15 is provided at a server side and the client tagged data 38 is generated at the server side. In another embodiment, the tag generation unit 15 is provided at a user side and the client tagged data 38 is generated at a user browser. The tag generation unit 15 includes a user interface unit 16 that collects a user data 28 from a plurality of users 30 and at least one of a webpage data 32 from a webpage hosting server 34. The user data 28 and the webpage data 32 are described in greater detail with respect to FIG. 3 below. The user interface unit 16 tags the user data 28 and the webpage data 32 based on the set of tagging rules 26 to generate a user tagged data 36. The user tagged data 36 is a code that is transmitted to the processing unit 18 communicatively coupled to the user interface unit 16. In an embodiment the code is a JavaScript™ code.

The tag generation unit 15 further includes the processing unit 18 that filters the user tagged data 36 received from the user interface unit 16 by accepting or rejecting the user tagged data. The user tagged data 36 is filtered based on the set of tagging rules 26 received from the client interface unit 14. The processing unit 18 generates a client tagged data 38 from the filtered user tagged data 36. The client tagged data 38 is transmitted to the output interface unit 20 communicatively coupled to the tag generation unit 15.

The output interface unit 20 receives the client tagged data 38 and analyzes the client tagged data 38 to generate web analytic reports 12 based on the set of tagging rules 26 received from the client interface unit 14. In an embodiment, the output interface unit 20 transfers the web analytic reports 12 to a display unit 40 for presentation. The operation of the system 10 can be better understood with a working example illustrated below.

In operation, for example, a marketing manager at a publisher's site inserts the set of predefined conditions 22. The conditions 22 may include monetary budget for a month allocated for web analytics, an age group of the users visiting the website, geographical location. The manager also inserts that a sampling rate of hundred percent is required for the newly added section on careers on Sundays from 1 pm to 9 pm. The manager further inserts a condition that a full sampling of the users originating from California should be done. Furthermore, the manager inputs 50 percent sampling for rest of the conditions. The manager further inserts that the reports with 95 percent confidence level should be generated. The system 10 automatically generates a set of tagging rules 26 satisfying the marketing managers conditions 22. The set of tagging rules 26 are transmitted to the tag generation unit 15 and the output interface unit 20. The tag generation unit 15 is installed at the user side within the user's browser or the server side i.e. within the webpage hosting server. The tag generation unit 15 collects the data according to the set of tagging rules 26 via tagging the data and generates appropriate JavaScript code for the tagged data referred to as "client tagged data 38" in the present application. The user's browser sends the client tagged data 38 to the output interface unit 20. The output interface unit 20 analyzes the client tagged data 38 and generates the web analytic reports 12 based on the set of tagging rules 26 with the confidence level inserted by the manager.

Figure 2:
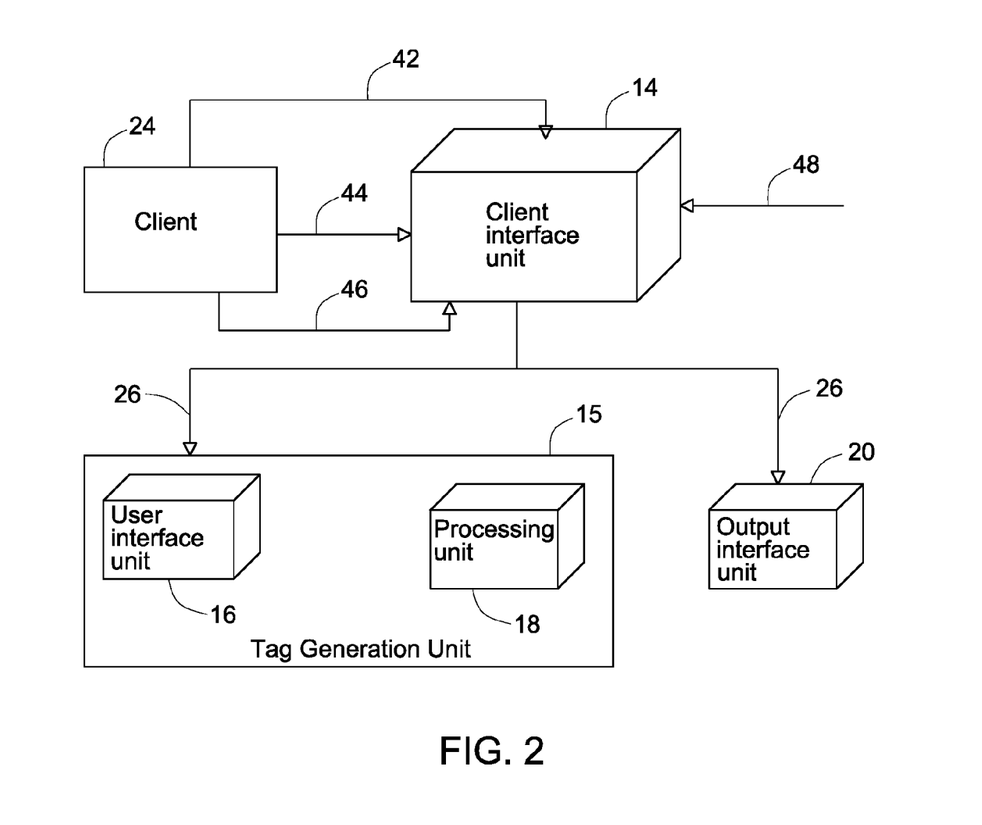
FIG. 2 is a block diagram of a client interface unit depicting inputs from a client and outputs in the system for generating web analytic reports of FIG. 1 in accordance with an embodiment of the invention.

FIG. 2 is a block diagram of the client interface unit 14 depicting inputs from a client 24 in the system 10 for generating web analytic reports 12 of FIG. 1 in accordance with an embodiment of the invention. The client interface unit 14 receives the one or more predefined tagging conditions 22 (FIG. 1) from the client 24 (FIG. 1). The one or more predefined tagging conditions 22 includes a budget 42 that is input by the client 24. The budget 42 includes the costs included in receiving the web analytic reports 12 from the vendors. In addition, the budget 42 could vary for different situations and circumstances according to the requirements of the client 24. The one or more predefined tagging conditions 22 further include a plurality of objectives 44 and one or more tracking levels 46 for generating the web analytic reports 12. As used herein, the term "plurality of objectives" is referred to a plurality of conditions required for tagging the web pages and the term "one or more tracking levels" is referred to a value assigned for tracking a level of accuracy of the web analytic reports. In an embodiment, the plurality of objectives 44 includes tagging a data originating from a particular geographical location, tagging specific web pages, tagging a specific content on web pages or a combination thereof. In one embodiment, the one or more tracking levels 46 include a sampling rate and a confidence level for the web analytic reports. In a particular embodiment, the client interface unit 14 suggests an alternative tracking level based on the budget 42 input by the client 24. In an exemplary embodiment, the one or more predefined tagging conditions 22 includes a historical web traffic data 48. The client interface unit 14 generates the set of tagging rules 26 as an "output" based on the one or more predefined tagging conditions 22. The set of tagging rules 22 is transmitted to the tag generation unit 15 and the output interface unit 20. The tag generation unit 15 and the output interface unit 20 will be described in greater detail with respect to FIG. 3-FIG. 5 respectively.

Figure 3:
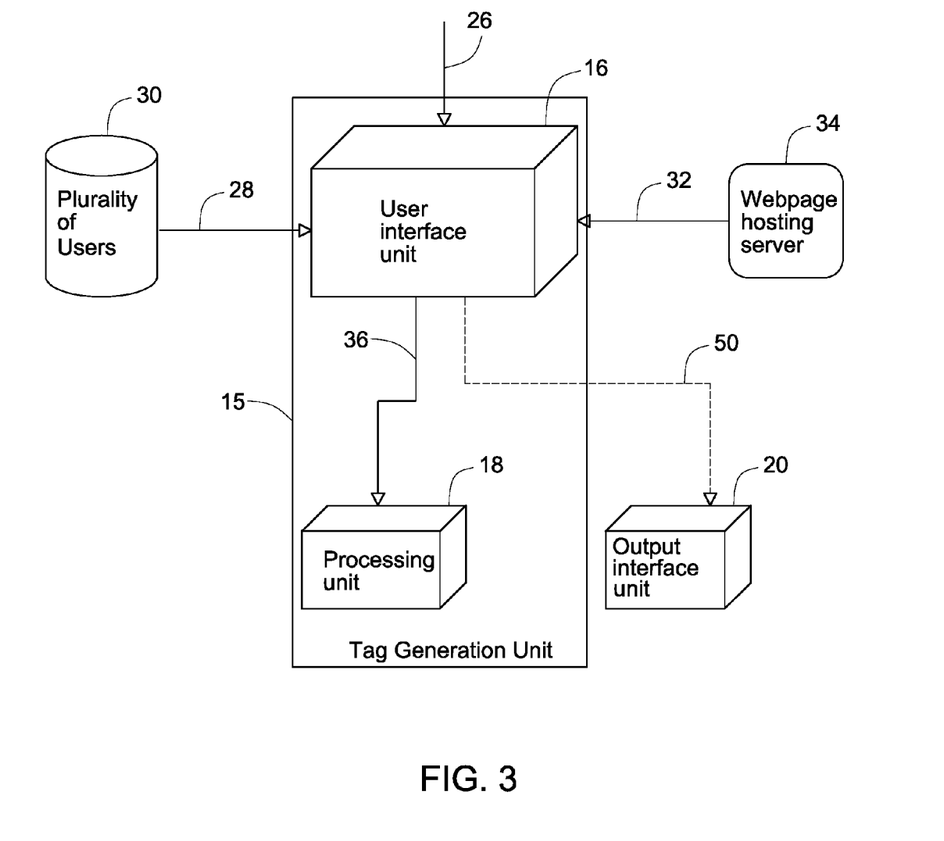
FIG. 3 is a block diagram of a tag generation unit including a user interface unit depicting the inputs from multiple users, web page hosting server and the client interface unit of FIG. 2 in the system for generating web analytic reports of FIG. 1 in accordance with an embodiment of the invention.

FIG. 3 is a block diagram of the tag generation unit 15 including the user interface unit 16 depicting the inputs from the plurality of users 30, the web page hosting server 34 and the client interface unit 14 of FIG. 2 in the system 10 for generating web analytic reports 12 of FIG. 1 in accordance with an embodiment of the invention. The tag generation unit 15 includes a user interface unit 16 that receives the set of tagging rules 26 (FIG. 2) from the client interface unit 14. Furthermore, the user interface unit 16 receives the user data 28 from plurality of users 30 (FIG. 1) and the at least one of the webpage data 32 from the webpage hosting server 34 (FIG. 1). In an exemplary embodiment, the user data 28 includes an IP address of the user, a referrer address, a username, a requested webpage and details of a user device. In a particular embodiment, the webpage data 32 includes page content, links on the webpage and default tags on the webpage. The user interface unit 16 collects the user data 28 and the web page data 32 based on the one or more tracking levels 46 (FIG. 2) as provided in the set of tagging rules 26. The one or more tracking levels 46 include the sampling rate at which the user data 28 and the webpage data 32 are sampled for collection. In an exemplary embodiment, the user data 28 and webpage data 32 may be collected using a predictive modeling and optimization to meet sophisticated budget 42 constraints and a plurality of objectives 44. Additionally, the one or more tracking levels 46 include a confidence level that determines the accuracy of the collected data and the web analytic reports 12. The user interface unit 16 tags the collected data and generates the user tagged data 36 including the code based on the set of tagging rules 26. In an embodiment, the user interface unit 16 transmits an optional data 50 including tagging statistics of the user data 28 and the webpage data 32 to the output interface unit 20. The user tagged data 36 is transmitted to the processing unit 18 communicatively coupled to the user interface unit 16 within the tag generation unit 15. The processing unit 18 is described in detail with respect to FIG. 4 below.

Figure 4:
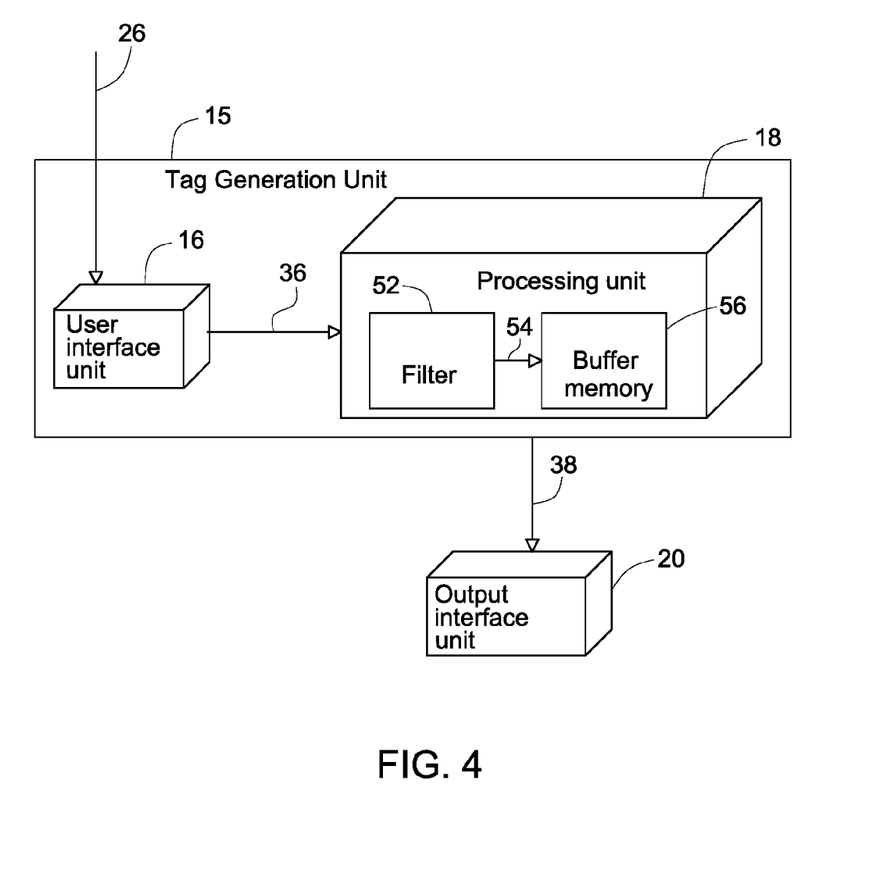
FIG. 4 is a block diagram of the tag generation unit including a processing unit depicting the inputs from the client interface unit of FIG. 2, user interface unit of FIG. 3 and the multiple users in the system for generating web analytic reports of FIG. 1 in accordance with an embodiment of the invention.

FIG. 4 is a block diagram of the tag generation unit 15 including the processing unit 18 depicting the inputs from the client interface unit 14 of FIG. 2, user interface unit 16 of FIG. 3 and the plurality of users 30 in the system 10 for generating web analytic reports 12 of FIG. 1 in accordance with an embodiment of the invention. The processing unit 18 includes a filter 52 that accepts or rejects the user tagged data 36 based on the set of tagging rules 26 (FIG. 2). The accepted data 54 at the output of the filter 52 is converted to the client tagged data 38 including dynamically generated tags. In an embodiment, the dynamically generated tags include a JavaScript™ code. In another embodiment, the processing unit 18 includes a buffer memory 56 for storing the client tagged data 38. The buffer memory 56 may store the client tagged data 38 for a particular user session and transfer the whole client tagged data 38 to the output interface unit 20 if deemed useful after the particular user session has terminated. The storing of client tagged data 38 in the buffer memory 56 for a particular user session is helpful in case of heavily visited sites with large bounce rate, as tracking of a random subset of user sessions contributing to very short visits is required. This reduces the quantity of client tagged data 38 to be analyzed and therefore reduces the cost of generating web analytic reports 12. The client tagged data 38 is transmitted to the output interface unit 20 communicatively coupled to the processing unit 18. The output interface unit 20 is described in greater detail with respect to FIG. 5 below.

Figure 5:
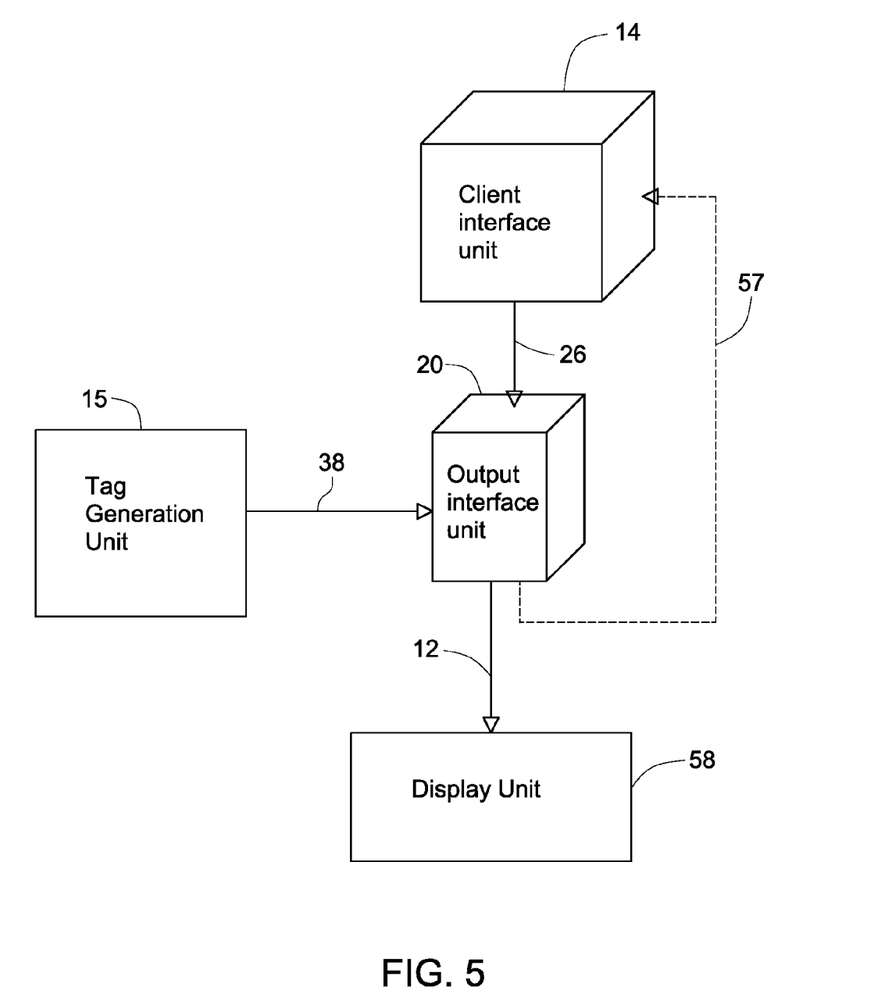
FIG. 5 is a block diagram of an output interface unit depicting the inputs from the client interface unit of FIG. 2 and the tag generation unit of FIG. 4 in the system for generating web analytic reports of FIG. 1 in accordance with an embodiment of the invention.

FIG. 5 is a block diagram representation of an output interface unit 20 depicting the inputs from the client interface unit 14 of FIG. 2, and the tag generation unit 15 of FIG. 4 in the system 10 for generating web analytic reports 12 of FIG. 1 in accordance with an embodiment of the invention. The output interface unit 20 receives the client tagged data 38 and analyzes the client tagged data 38 to generate web analytic reports 12. The web analytic reports 12 include raw statistics, projected statistics and error estimates of a data relative to the plurality of objectives 44 included in the set of tagging rules 26. In an exemplary embodiment, the output interface unit sends a reference data 57 to the client interface unit for future references for determining the one or more predefined tagging conditions 22. In an embodiment, a display unit 58 may be coupled to the output interface unit 20 to display the web analytic reports 12. A method 60 for generating web analytic reports 12 is described below in detail with respect to FIG. 6.

Figure 6:
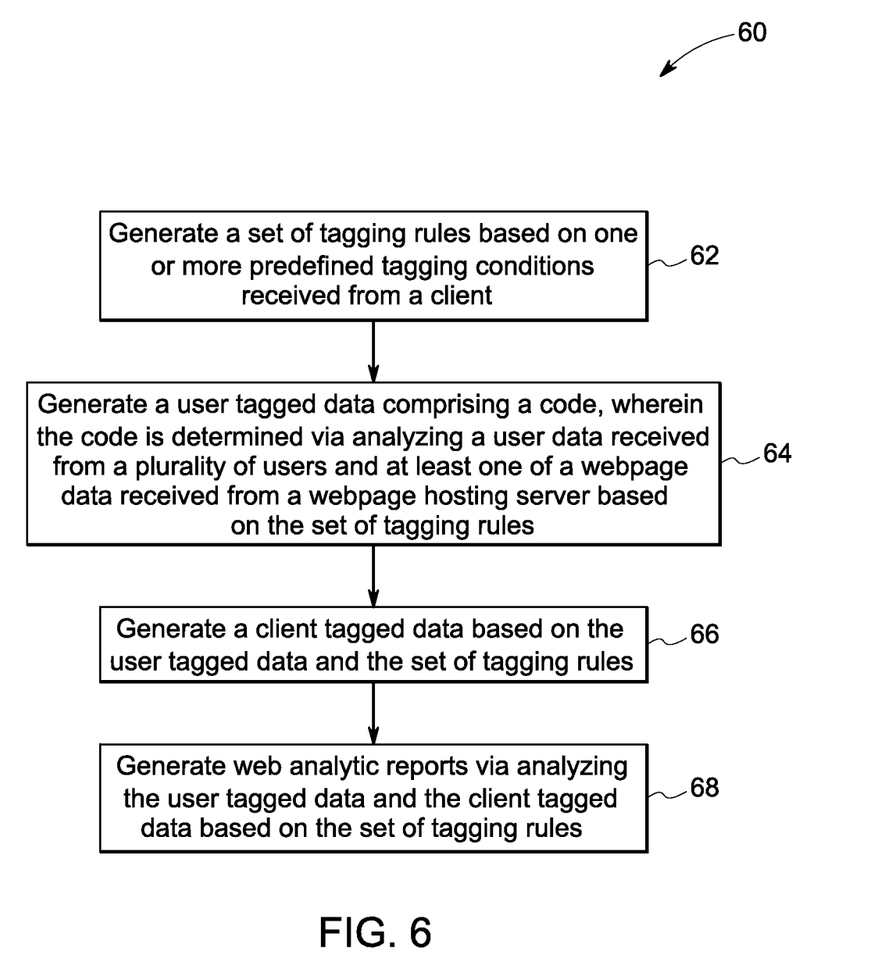
FIG. 6 is flow chart depicting the steps involved in a method for generating web analytic reports in accordance with an embodiment of the invention.

FIG. 6 is flow chart depicting the steps involved in a method for generating web analytic reports in accordance with an embodiment of the invention. The method includes generating a set of tagging rules based on one or more predefined tagging conditions received from a client in step 62. In an embodiment, the one or more predefined tagging conditions received from the client includes a budget, a plurality of objectives and one or more tracking levels for generating the web analytic reports. In a particular embodiment, the one or more tracking levels received from the client includes a sampling rate and a confidence level for generating the web analytic reports. In another embodiment, a historical web data is received to generate the set of tagging rules. In an exemplary embodiment, the client interface unit suggests an alternative tracking level based on the received budget to generate the set of tagging rules. A user tagged data including a code is generated in step 64. The code is determined via analyzing a user data received from a plurality of users and at least one of a webpage data received from a webpage hosting server based on the set of tagging rules. In an embodiment, the user data and the webpage data is collected based on the one or more tracking levels. In another embodiment, the user data and the webpage data is collected via tagging the user data and the webpage data. In an exemplary embodiment, the code includes a JavaScript™ code. A client tagged data is generated based on the user tagged data received from the user interface unit in step 66. The user tagged data is filtered based on the set of tagging rules to generate the client tagged data. In an embodiment, the user tagged data is filtered via accepting or rejecting the user tagged data based on the set of tagging rules. In another embodiment, the client tagged data is stored in a buffer memory and transmitted to the output interface unit. The method also includes generating a web analytic report via analyzing the client tagged data in step 68. The output interface unit receives the client tagged data from the tag generation unit. In an embodiment, a projected statistics, raw statistics and error estimates of the client tagged data are calculated based on the plurality of objectives and the tracking levels. In a particular embodiment, the projected statistics, raw statistics and the error estimates are displayed.

The various embodiments of a system and method for generating web analytic reports described above include a client interface unit, a user interface unit, a processing unit and an output interface unit configured to generate web analytic reports. Thus, these tools and techniques enable the client or organizations to reduce the volume of data transmitted to the vendors for analysis, thereby decreasing the cost of receiving web analytic reports from the vendors. Furthermore, the tools enable the client to insert a set of predefined conditions according to the requirements of the client for different situations and circumstances and receive accurate web analytic reports in a fixed allocated budget.

Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. For example, a buffer memory with respect to one embodiment can be adapted for use with the output interface unit described with respect to another embodiment of the invention to scale the switching rating of the switching array. Similarly, the various features described, as well as other known equivalents for each feature, may be mixed and matched by one of ordinary skill in this art to construct additional systems and techniques in accordance with principles of this disclosure.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for generating web analytic reports for a webpage of an organization, comprising:
   a webpage hosting server within the organization for presenting the webpage;
   a client interface unit within the organization configured to receive one or more predefined tagging conditions from a client within the organization for generating a set of tagging rules based on the one or more predefined tagging conditions, wherein the tagging conditions represent conditions useful for determining how to filter user tagged data;
   a tag generation unit within the organization communicatively coupled to the client interface unit, the tag generation unit configured to output client tagged data comprising:
      a user interface unit configured to receive user data from a plurality of users accessing the organization's webpage and webpage data from the webpage hosting server within the organization associated with the users' access of the organization's webpage for generating the user tagged data comprising a code based on the user data and the webpage data;
      a processing unit communicatively coupled to the user interface unit for receiving the user tagged data, wherein the processing unit is configured to generate the client tagged data based on filtering the user tagged data using the set of tagging rules; and
   an output interface unit within the organization communicatively coupled to the tag generation unit for receiving the client tagged data, the output interface unit generates a web analytics report for the organization via analyzing the client tagged data based on the set of tagging rules.

2. The system of claim 1, wherein the one or more predefined tagging conditions comprise a budget for generating the web analytics reports, a plurality of objectives for generating the web analytics reports, and one or more tracking levels defining a level of accuracy for generating the web analytics reports.

3. The system of claim 2, wherein the plurality of objectives comprise tagging data originating from a particular geographical location, tagging specific web pages, tagging specific content on web pages or a combination thereof.

4. The system of claim 2, wherein the one or more tracking levels comprise a sampling rate and a confidence level for the reports.

5. The system of claim 1, wherein the one or more predefined tagging conditions comprise historical web traffic data.

6. The system of claim 2, wherein the client interface unit suggests an alternative tracking level based on the budget.

7. The system of claim 1, wherein the user interface unit collects the user data and the webpage data based on the one or more tracking levels.

8. The system of claim 1, wherein the user data comprises an IP address of the user, a referrer address, a username, a requested webpage and details of a user device.

9. The system of claim 1, wherein the webpage data comprises a page content, a link on the webpage and a default tag on the webpage.

10. The system of claim 1, wherein the code comprises a JavaScript™ code.

11. The system of claim 1, wherein the processing unit comprises a filter, wherein the filter accepts or rejects the user tagged data based on the set of tagging rules.

12. The system of claim 1, wherein the processing unit comprises a buffer memory, wherein the buffer memory stores the client tagged data.

13. The system of claim 1, wherein the web analytics report comprises a raw statistics, a projected statistics and an error estimate of the client tagged data.

14. A method for generating web analytics reports for an organization comprising:
   presenting a webpage;
   generating a set of tagging rules based on one or more predefined tagging conditions received from a client within the organization, wherein the tagging conditions represent conditions useful for determining how to filter user tagged data;
   generating user tagged data comprising a code, wherein the code is determined via analyzing user data received from a plurality of users and webpage data received from a webpage hosting server within the organization based on the set of tagging rules;
   generating client tagged data based on filtering the user tagged data using the set of tagging rules; and
   generating a web analytics report via analyzing the user tagged data and the client tagged data based on the set of tagging rules.

15. The method of claim 14, wherein receiving the one or more predefined tagging conditions from the client comprises receiving a budget, a plurality of objectives and one or more tracking levels defining a level of accuracy for generating the web analytics reports.

16. The method of claim 15, wherein receiving the one or more tracking levels from the client comprises receiving a sampling rate and a confidence level for generating the web analytic reports.

17. The method of claim 14, wherein generating the set of tagging rules comprises receiving historical web data.

18. The method of claim 15, wherein generating the set of tagging rules comprises suggesting one or more alternative tracking levels based on the budget.

19. The method of claim 14, comprising transmitting the one or more tracking levels to an output interface unit within the organization.

20. The method of claim 14, wherein generating the user tagged data comprises collecting the user data and the webpage data based on the one or more tracking levels.

21. The method of claim 20, wherein collecting the user data and the webpage data comprises tagging the user data and the webpage data.

22. The method of claim 14, wherein generating the code comprises generating a JavaScript™ code.

23. The method of claim 14, wherein generating the client tagged data comprises filtering the code based on the plurality of objectives.

24. The method of claim 23, wherein filtering the code comprises accepting or rejecting the code based on the plurality of objectives.

25. The method of claim 14, wherein generating the client tagged data comprises storing the accepted code in a buffer memory.

26. The method of claim 14, wherein generating the web analytics report comprise receiving the client tagged data from a tag generation unit.

27. The method of claim 14, wherein generating the web analytics report comprises calculating a projected statistics, raw statistics and error estimates of the client tagged data based on the plurality of objectives and the one or more tracking levels.

28. The method of claim 14, wherein generating the web analytics report comprises displaying projected statistics, raw statistics and error estimates of the plurality of objectives.

* * * * *